United States Patent
Enomoto (10) Patent No.: US 9,976,888 B2
(45) Date of Patent: May 22, 2018

(54) FLOW MEASURING DEVICE

(71) Applicant: DENSO CORPORATION, Kariya, Aichi-pref. (JP)

(72) Inventor: Takashi Enomoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 190 days.

(21) Appl. No.: 15/164,006

(22) Filed: May 25, 2016

(65) Prior Publication Data
US 2016/0356231 A1    Dec. 8, 2016

(30) Foreign Application Priority Data
Jun. 2, 2015    (JP) ................. 2015-111832

(51) Int. Cl.
*G01F 1/696* (2006.01)
*F02D 41/18* (2006.01)

(52) U.S. Cl.
CPC .............. *G01F 1/696* (2013.01); *F02D 41/18* (2013.01); *Y02T 10/142* (2013.01)

(58) Field of Classification Search
CPC ............ G01F 1/696; G01F 1/684; F02D 41/18
See application file for complete search history.

(56) References Cited

U.S. PATENT DOCUMENTS

2012/0101745 A1    4/2012 Kohno et al.

FOREIGN PATENT DOCUMENTS

| JP | 2865785 | 12/1998 |
|---|---|---|
| JP | 5112184 | 1/2013 |

*Primary Examiner* — Robert Deberadinis
(74) *Attorney, Agent, or Firm* — Nixon & Vanderhye P.C.

(57) ABSTRACT

A flow measuring device includes an output portion that outputs an electric signal having a shape of rectangle wave with an edge rising or falling in a signal value. The electric signal corresponds to a flow rate of intake air drawn into an internal-combustion engine. The output portion applies or stops a control voltage to a switching element disposed in an output wiring through which the electric signal is output so as to form the edge. The output portion has an edge relief part that changes the control voltage with progress of time so as to gradually increase or decrease the signal value at the edge.

14 Claims, 8 Drawing Sheets

FLOW MEASURING DEVICE

CROSS REFERENCE TO RELATED APPLICATION

This application is based on Japanese Patent Application No. 2015-111832 filed on Jun. 2, 2015, the disclosure of which is incorporated herein by reference in its entirety.

TECHNICAL FIELD

The present disclosure relates to a flow measuring device.

BACKGROUND

An electronic control unit (ECU) controls fuel injection for an internal-combustion engine and ignition in each cylinder of the internal-combustion engine based on parameters such as the amount of intake air. The ECU obtains the amount of intake air based on an electric signal outputted through a harness from a flow measuring device. The ECU computes the fuel injection timing and period, ignition timing, etc. using the amount of intake air to perform the fuel injection and ignition.

An electric signal (such as flow signal) outputted from a flow measuring device has a rectangle wave shape with a rising edge and a falling edge in a signal value. The flow measuring device applies a control voltage to a switching element disposed in an output wiring, and a voltage of a logic high or a logic low is output to the output wiring, for the ECU.

For this reason, the flow signal contains harmonic component, which may become a source of noise, such that an apparatus around a harness corresponding to the output wiring may be affected. JP 2865785 B2 describes a delay circuit in which a switching element and a capacity element are connected in parallel so as to make a rising and a falling in the waveform gentle. However, each of the rising and the falling itself is still steep, such that a flow signal may still become a noise source in JP 2865785 B2.

SUMMARY

It is an object of the present disclosure to provide a flow measuring device, in which a flow signal is restricted from becoming a noise source.

According to an aspect of the present disclosure, a flow measuring device includes an output portion that outputs an electric signal having a shape of rectangle wave with an edge rising or falling in a signal value. The electric signal corresponds to a flow rate of intake air drawn into an internal-combustion engine. The output portion applies or stops a control voltage to a switching element disposed in an output wiring through which the electric signal is output so as to form the edge. The flow measuring device further includes an edge relief part that changes the control voltage with progress of time so as to gradually increase or decrease the signal value at the edge.

The edge relief part may have a pattern instruction part and a control voltage output unit. The pattern instruction part memorizes a pattern in which the signal value is changed at the edge and that outputs a plurality of instruction values as time series data which defines the pattern one by one according to progress of time. The control voltage output unit changes and outputs the control voltage with progress of time according to the instruction values outputted from the pattern instruction part.

Thereby, the rising and the falling of the control voltage can be made gentle by the edge relief part. For this reason, the edge relief part can indirectly ease the steepness in the rising and the falling of the flow signal. Therefore, in the flow measuring device, a flow signal can be restricted from becoming a noise source.

According to an aspect of the present application, a flow measuring device includes a switch circuit and an edge relief part. The switch circuit has a plurality of switching elements connected in parallel, and is a part of an output wiring for outputting an electric signal. A control voltage is applied or stopped relative to at least one of the switching elements when an edge is formed. The edge relief part changes the number of the switching elements to which the control voltage is applied or stopped with progress of time so as to gradually increase or decrease the signal value at the edge.

The edge relief part may have a pattern instruction part and a control voltage output unit. The pattern instruction part memorizes a pattern in which the signal value is changed at the edge and that outputs a plurality of instruction values as time series data which defines the pattern one by one according to progress of time. The control voltage output unit outputs the control voltage and changes the number of the switching elements to which the control voltage is applied or stopped with progress of time according to the instruction values outputted from the pattern instruction part.

Thereby, the edge relief part can directly ease the steepness in the rising and the falling of the flow signal. Therefore, in the flow measuring device, a flow signal can be further restricted from becoming a noise source.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 3:
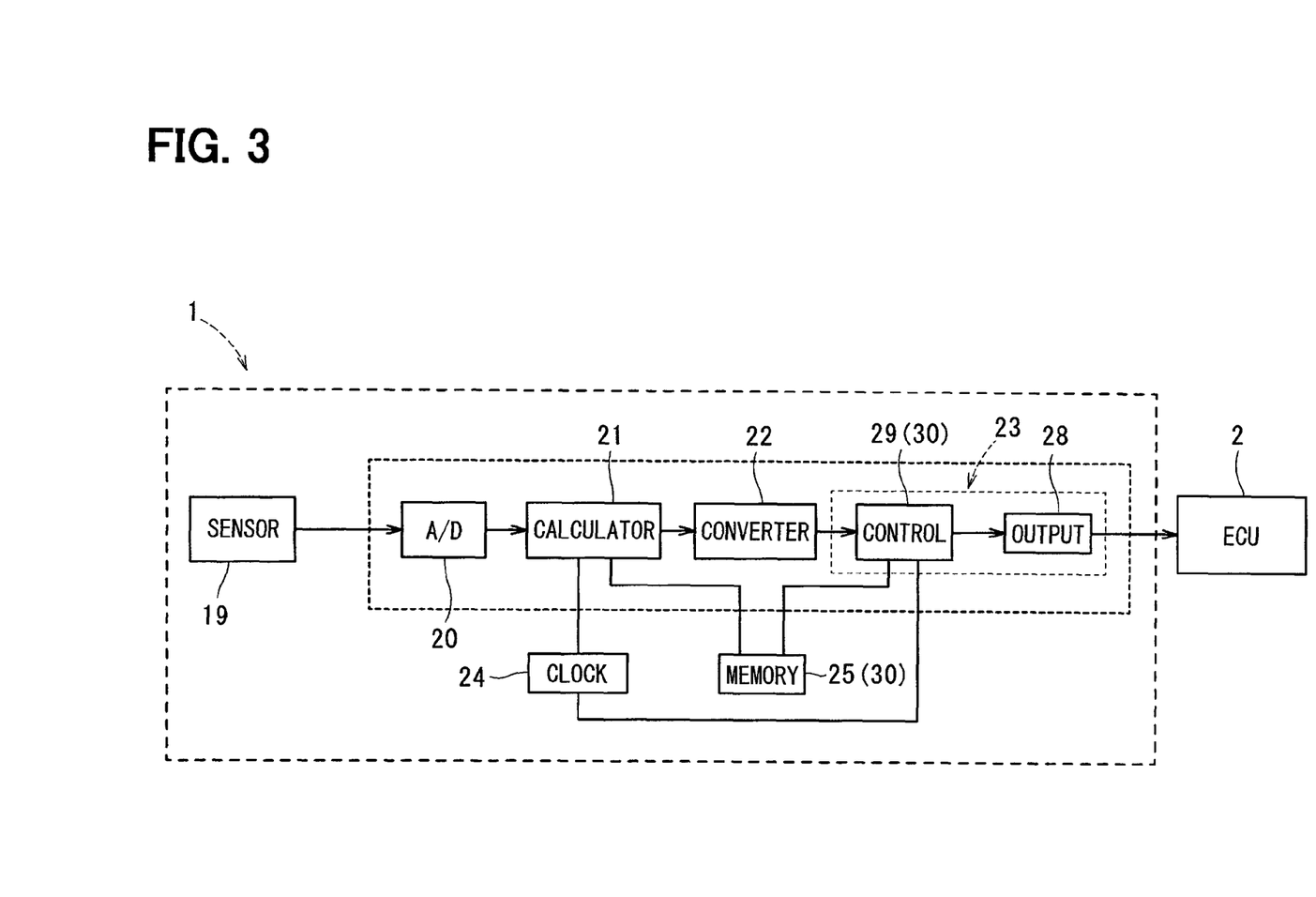
FIG. 3 is a block diagram illustrating the flow measuring device of the first embodiment.
Figure 4:
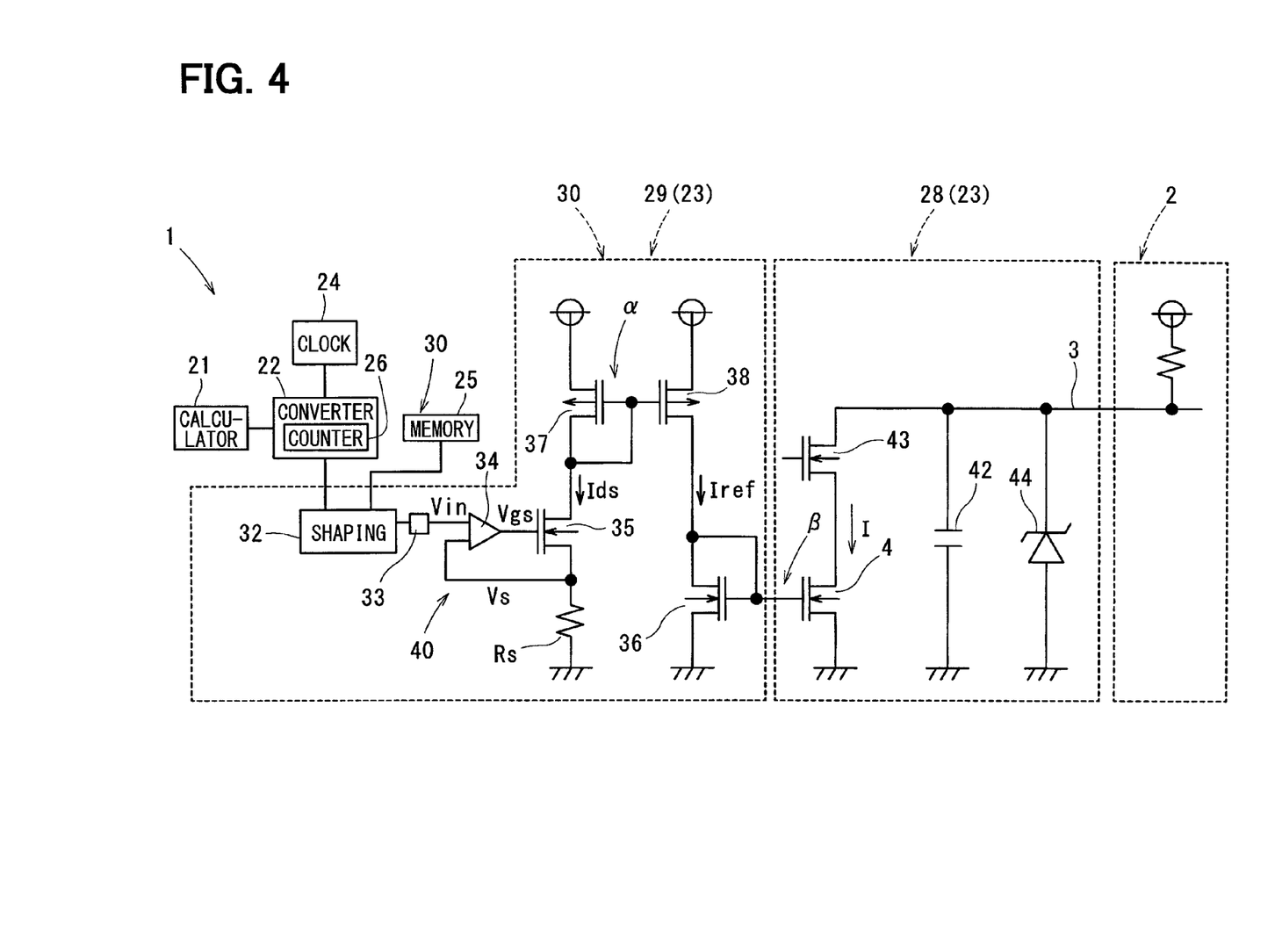
FIG. 4 is a circuit diagram illustrating the flow measuring device of the first embodiment.

A flow measuring device 1 according to a first embodiment measures a flow rate of intake air (the amount of intake air) drawn into an internal-combustion engine (not shown), and outputs an electric signal (flow signal) according to the amount of intake air. As shown in FIG. 3 and FIG. 4, the flow signal outputted from the flow measuring device 1 is inputted into an electronic control unit (ECU) 2 which controls operation of the internal-combustion engine, and is used for fuel injection control or ignition control. That is, ECU 2 calculates the amount of intake air based on the flow signal outputted through a harness from the flow measuring device 1. Further, ECU 2 executes the injection and ignition of fuel by calculating the fuel injection timing and period, the ignition timing, etc. using the amount of intake air.

Figure 2:
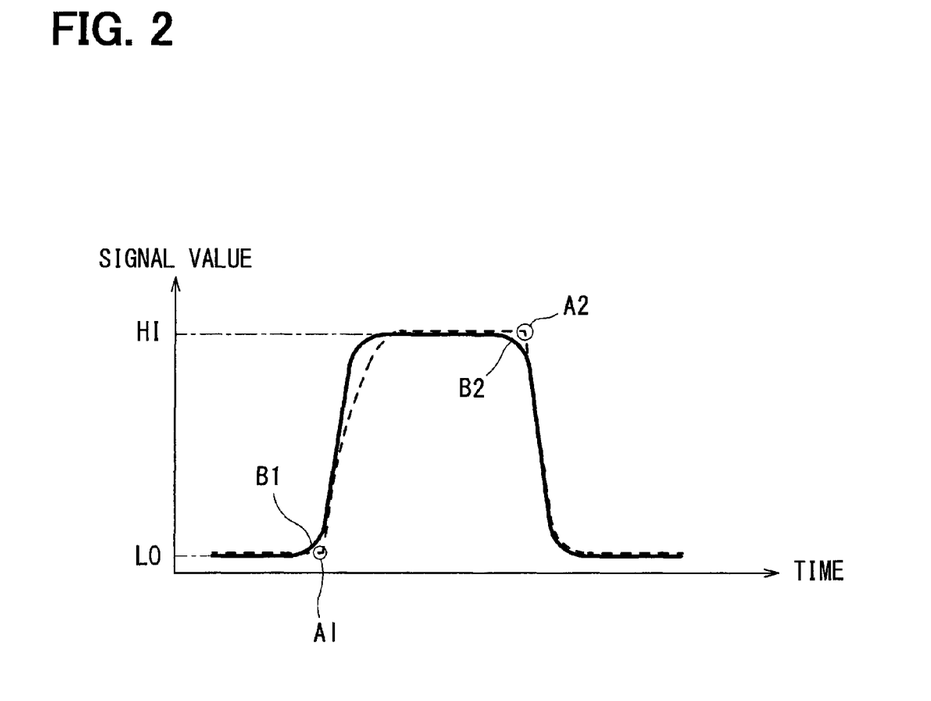
FIG. 2 is a time chart illustrating a flow signal of the first embodiment relative to a comparison example.

The flow signal outputted from the flow measuring device 1 is an electric signal having a rectangle wave shape with a rising edge and a falling edge as a signal value (refer to FIG. 2). That is, the flow measuring device 1 forms the edge in a flow signal by applying or stopping a control voltage to a main element 4 such as switching element disposed in an output wiring 3 (refer to FIG. 4). The flow measuring device 1 applies a voltage of a logic high or a logic low to the harness corresponding to the output wiring 3, such that the flow signal is input into ECU 2.

Figure 1:
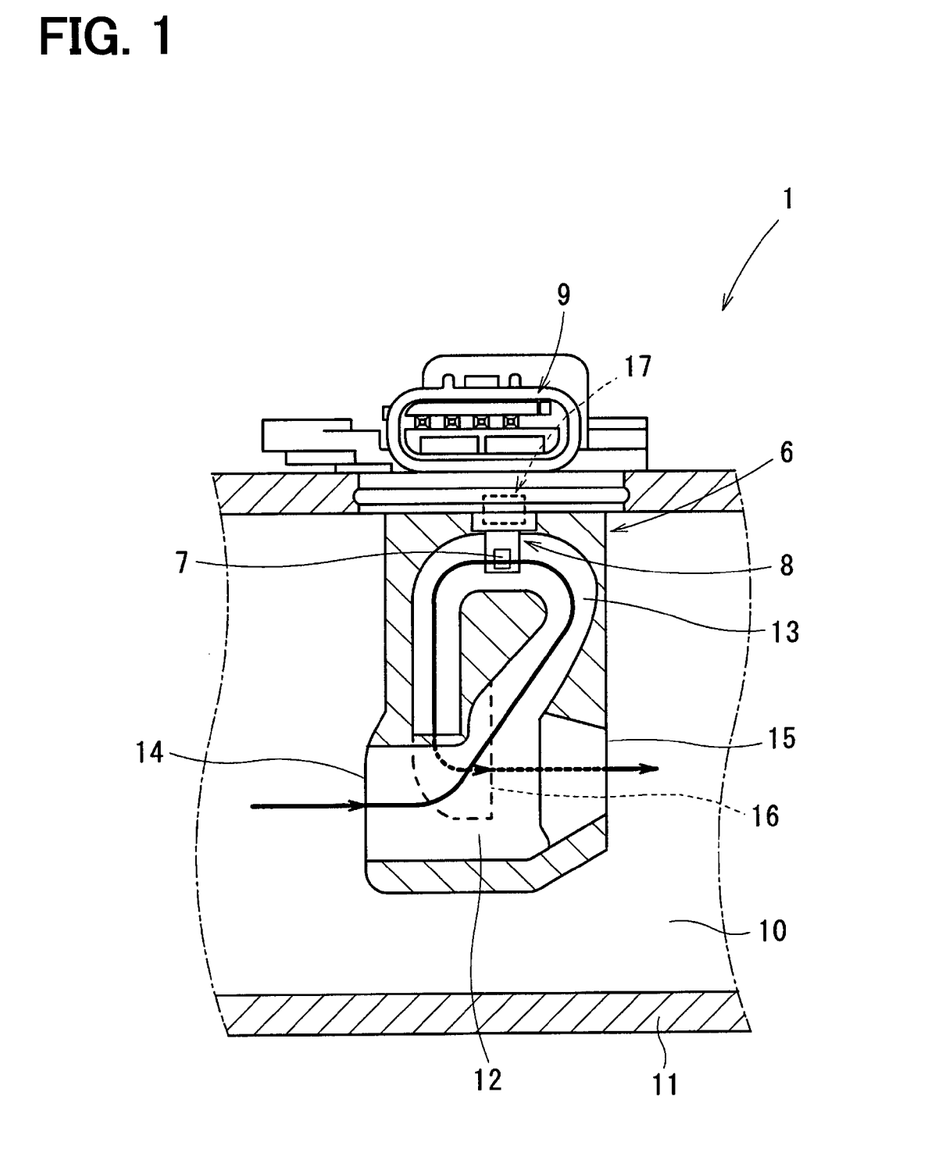
FIG. 1 is a sectional view illustrating a flow measuring device according to a first embodiment, which is attached to a duct.

As shown in FIG. 1, the flow measuring device 1 includes a case 6 made of resin, a sensor assay 8 and a connector 9. The sensor assay 8 has a sensor chip 7 which generates a flow signal, and is fixed to the case 6. The connector 9 outputs the flow signal. The flow measuring device 1 is attached to a duct 11 which forms a passage 10 for intake air, and is projected into the passage 10.

The case 6 has a first bypass channel 12 and a second bypass channel 13. A part of intake air bypasses the passage 10 by passing through the first bypass channel 12. A part of intake air further bypasses the first bypass channel 12 by passing through the second bypass channel 13. The sensor chip 7 is arranged in the second bypass channel 13. The flow measuring device 1 generates a flow signal corresponding to the flow rate of air in the second bypass channel 13, due to heat transfer between the sensor chip 7 and the air flowing through the second bypass channel 13.

The first bypass channel 12 has an intake port 14 from which air flows straight in parallel with the flow of air in the passage 10, and is returned to the passage 10 from an outlet port 15 of the first bypass channel 12. A foreign substance contained in the intake air is made to go straight, so as not to flow toward the sensor chip 7. Air flowing from the first bypass channel 12 flows round in the second bypass channel 13, and is returned to the passage 10 from an outlet port 16. The flow distance of air is increased compared with a case where the air flows straight, such that the accuracy of flow signal is raised. The sensor chip 7 is positioned in the second bypass channel 13, where the flow direction of air is opposite to the flow direction of air in the passage 10.

The sensor assay 8 has a circuit chip 17 in addition to the sensor chip 7. A resin component receiving the sensor chip 7 is molded by resin, together with the circuit chip 17, as the sensor assay 8. The sensor chip 7 has a predetermined substrate and various kinds of elements (not shown) on the surface of the substrate, as a flow sensor 19 (refer to FIG. 3). The flow sensor 19 is a thermo-sensitive sensor which generates a flow signal by heat transfer between the elements and air.

The circuit chip 17 has a circuit for performing a predetermined processing to the signal acquired with the flow sensor 19. A bonding wire (not shown) connects the circuit of the sensor chip 7 to the circuit of the circuit chip 17. Specifically, as shown in FIG. 3 and FIG. 4, the circuit chip 17 has circuits functioning as an A/D conversion part 20, a digital calculation part 21, a frequency conversion part 22, an output unit 23, a clock circuit 24, and a storage part 25.

The A/D conversion part 20 converts an analog signal outputted from the sensor chip 7 into a digital value. The digital calculation part 21 performs calculation such as correction to the digitized numerical value of the amount of intake air. A clock signal is supplied to the digital calculation part 21 from the clock circuit 24. A program and data required for the calculation are provided from the storage part 25. The storage part 25 is a common memory such as ROM or RAM.

The frequency conversion part 22 converts the digital value indicating the amount of intake air into frequency. A flow signal represents the amount of intake air at a cycle of, for example, rising or falling in the signal value in the output wiring 3. The frequency conversion part 22 converts the digital value inputted from the digital calculation part 21 into the frequency of electric signal outputted to ECU 2.

As shown in FIG. 4, a counter 26 is disposed in the frequency conversion part 22. The counter 26 counts based on the clock signal supplied from the clock circuit 24. When the count value reaches the digital value inputted from the digital calculation part 21, an edge instruction signal indicating a rising or falling in the signal value is output to the output unit 23.

The output unit 23 has an external output portion 28 and a control voltage output unit 29. The external output portion 28 includes the main element 4. In the flow measuring device 1, an edge is formed in the flow signal by applying or stopping the control voltage to the main element 4. The control voltage output unit 29 generates the control voltage based on the edge instruction signal, and outputs the control voltage to the main element 4. While the output wiring 3 is pulled up, the output unit 23 outputs a logic high when the main element 4 is OFF, and outputs a logic low when the main element 4 is ON. The main element 4 may be, for example, n-type MOSFET.

The control voltage output unit 29 and the storage part 25 may correspond to an edge relief part 30 of the flow measuring device 1. The edge relief part 30 gradually increases or decreases the signal value at the edge of a flow signal by changing the control voltage with progress of time.

The storage part 25 may correspond to a pattern instruction part memorizing a pattern in which the signal value is varied at the edge with progress of time. Further, the pattern instruction part sequentially outputs plural instruction values as time series data which defines the pattern according to progress of time. The control voltage output unit 29 changes and outputs the control voltage with progress of time according to the instruction values outputted from the pattern instruction part.

The edge relief part 30 eases the steepness, as shown in FIG. 2, at the rising pattern A1 and the falling pattern A2 in the output signal. The storage part 25 memorizes the rising pattern B1 and the falling pattern B2 in which the edge steepness is reduced compared with the rising pattern A1 and the falling pattern A2, as plural instruction values corresponding to time series data. The instruction value may be set in various modes, such as time series data indicating variations in the signal value itself, or time series data indicating variations in temporal change rate of the signal value.

The storage part 25 starts outputting instruction values in response to a demand from the control voltage output unit 29, and outputs the instruction values one by one according to progress of time. The time series data of the instruction value memorized in the storage part 25 to ease the edge steepness is referred to data for relief.

As shown in FIG. 4, the control voltage output unit 29 includes a waveform-shaping part 32, a D/A conversion part 33, a comparator 34, two switching elements 35 and 36 such as n-type MOSFET(s), two switching elements 37 and 38 such as p-type MOSFET(s), and a resistor Rs. The switching elements 35-38 are hereafter called as sub elements 35-38.

The waveform-shaping part 32 temporally changes and outputs the digital value corresponding to the signal value at the edge, based on the edge instruction signal outputted from the frequency conversion part 22 and the data for relief memorized in the storage part 25.

When the edge instruction signal is inputted from the frequency conversion part 22, the waveform-shaping part 32 requires the data for relief to the storage part 25. Accordingly, the storage part 25 starts outputting the data for relief, and outputs the data for relief one by one according to progress of time. Thereby, the waveform-shaping part 32 calculates and outputs a digital value one by one based on the value of the data for relief inputted one by one. The D/A conversion part 33 converts the digital value outputted from the waveform-shaping part 32 into an analog voltage Vin, and outputs the analog voltage Vin.

The comparator 34, the sub element 35, and the resistor Rs may correspond to a current generating part 40 which generates a current Ids based on the voltage Vin outputted from the D/A conversion part 33. The plus side input terminal of the comparator 34 is connected to the D/A conversion part 33, and the voltage Vin is inputted into the comparator 34 from the D/A conversion part 33. The output terminal of the comparator 34 is connected to the gate of the sub element 35, and a voltage Vgs outputted from the comparator 34 is applied to the gate of the sub element 35.

The source of the sub element 35 is connected to a ground through the resistor Rs, and the electric potential of the resistor Rs on the high potential side is fed back to the comparator 34 as a voltage Vs. The drain of the sub element 35 is connected with the drain of the sub element 37. When the current Ids equivalent to Vs/Rs flows into the sub element 35, the current Ids is outputted from the current generating part 40.

The sub elements 37 and 38 define a current mirror circuit α. The gate of the sub element 37 is connected to the drain side of the sub element 37, and connected to the gate of the sub element 38, while the sources of the sub elements 37 and 38 are connected to high potential side such as power supply. The drain of the sub element 38 is connected to the drain of the sub element 36. Thereby, in the current mirror circuit a, the current Ids generated in the current generating part 40 is an input current, and the current Iref flows into the sub element 38. That is, the current mirror circuit a outputs the current Iref while the current Ids is an input current.

The sub element 36 and the main element 4 configure a current mirror circuit β. The gate of the sub element 36 is connected to the drain side of the sub element 36, and is connected to the gate of the main element 4. The sources of the sub element 36 and the main element 4 are connected to a ground. Thereby, in the current mirror circuit β, the current Iref outputted from the current mirror circuit a is an input current, and the current I flows into the main element 4 (i.e., the output wiring 3). That is, the current mirror circuit β outputs the current I while the current Iref is an input current.

Thus, the voltage Vin is generated by the waveform-shaping part 32 and the D/A conversion part 33 according to the edge instruction. In connection with this, in the current generating part 40, ON/OFF operation of the sub element 35 by the comparator 34 starts, and the current Ids occurs. Simultaneously, in the current mirror circuit a, while the applying of the control voltage to the gates of the sub elements 37 and 38 starts, and the current Iref occurs. Furthermore, in the current mirror circuit β, while the applying of the control voltage to the gates of the sub element 36 and the main element 4 starts, the current I occurs in the output wiring 3.

As the voltage Vin is temporally changed by the serial inputs of the data for relief, the current Ids and the control voltage in the gates of the sub elements 37 and 38 change temporally. Further, the current Iref, the control voltage in the gates of the sub element 36 and the main element 4, and the current I change temporally.

As a result, the steepness in the falling of the signal value (potential) of the output wiring 3 is eased and lowered from the logic high to the logic low based on the data for relief (see the patterns A2, B2 of FIG. 2). Similarly, the steepness in the rising of the signal value of the output wiring 3 is eased from the logic low to the logic high (see the patterns A1, B1 of FIG. 2).

The external output portion 28, as shown in FIG. 4, has a capacity element 42, a second main element 43, and a Zener diode 44. The capacity element 42 is connected in parallel with the main element 4, and absorbs the emission noise produced in the output wiring 3, such that the temporal change of the current I is made more gentle.

The second main element 43 is, for example, a n-type MOSFET which has a withstand voltage that is higher than that of the main element 4. The second main element 43 is connected in series of the main element 4 on the high potential side of the main element 4, and protects the main element 4 from the noise produced in the output wiring 3. The Zener diode 44 is connected in parallel with the main element 4, and protects the main element 4 when excess voltage is applied to the output wiring 3. The excess voltage is made to flow into a ground by the Zener diode 44.

According to the first embodiment, the flow measuring device 1 has the edge relief part 30 that gradually increases or decreases the signal value at the edge of a flow signal by changing the control voltage applied to the main element 4 with progress of time. The edge relief part 30 has the storage part 25 and the control voltage output unit 29.

The storage part 25 memorizes the pattern in which the signal value is changed at the edge with progress of time, and outputs instruction values as time series data which define the pattern one by one according to progress of time. The control voltage output unit 29 changes and outputs the control voltage with progress of time according to the instruction values outputted from the storage part 25.

Thereby, the rising and the falling of the control voltage can be made gentle by the edge relief part 30. For this reason, the edge relief part 30 indirectly eases the steepness in the rising and the falling of a flow signal. Therefore, harmonic component can be removed from a flow signal in the output wiring 3 of the flow measuring device 1 so as to reduce a noise source.

Second Embodiment

Figure 5:
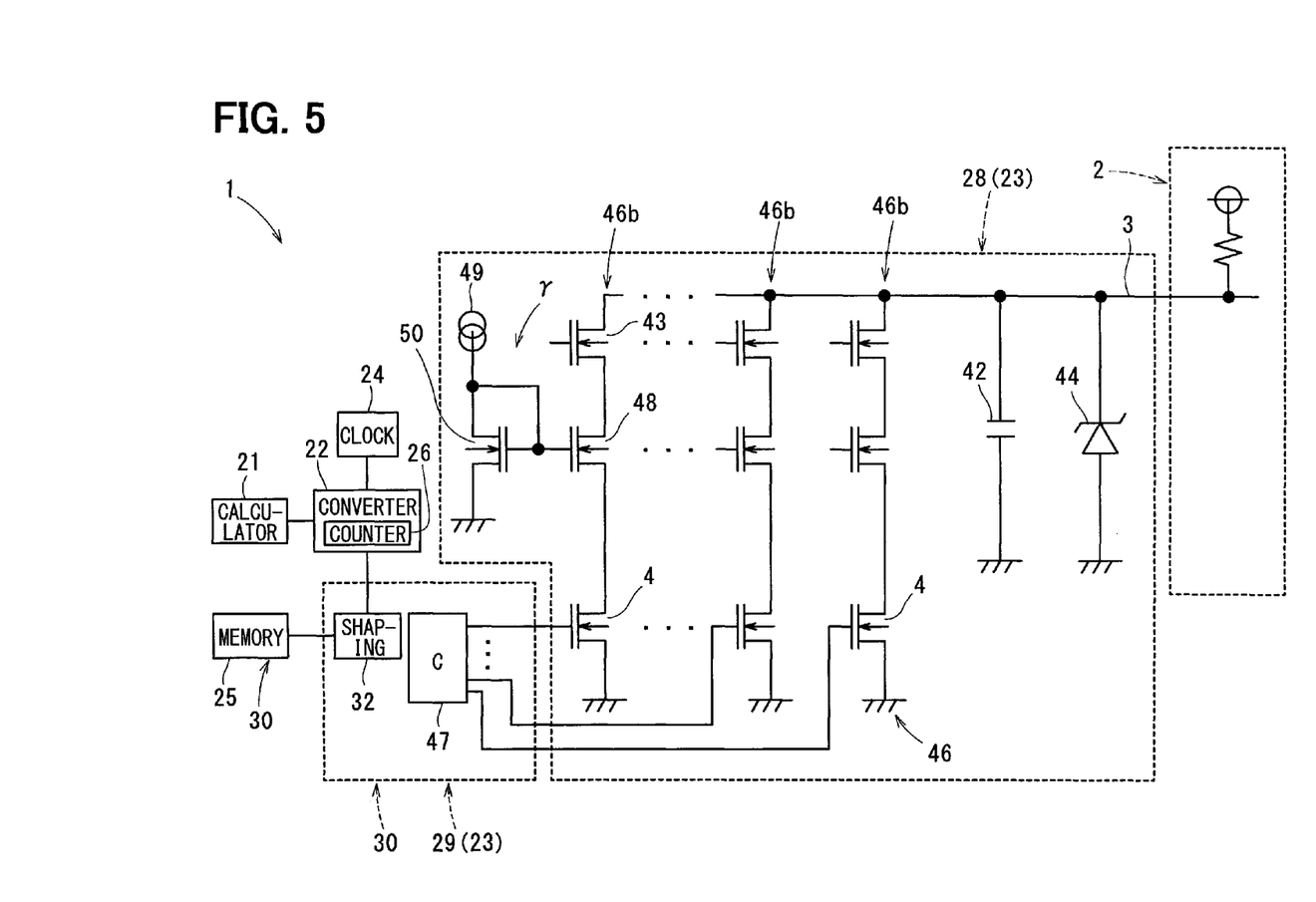
FIG. 5 is a circuit diagram illustrating a flow measuring device according to a second embodiment.

The external output portion 28 of the flow measuring device 1 of the second embodiment has plural main elements 4, as a switch circuit 46 (refer to FIG. 5). The switch circuit 46 is a parallel circuit in which the main elements 4 are connected in parallel, and is a part of the output wiring 3. When forming an edge, the control voltage is applied or stopped by at least one of the main elements 4.

The edge relief part 30 changes the total ON number of the main elements 4 to which the control voltage is applied with progress of time. Thus, the signal value is gradually increased or decreased at the edge. Specifically, according to the edge relief part 30 of the second embodiment, the control voltage output unit 29 changes the total ON number of the main elements 4 to which the control voltage is applied with progress of time in response to the data for relief outputted from the storage part 25.

The control voltage output unit 29 of the second embodiment has a switch control circuit 47 instead of the D/A conversion part 33 and the current generating part 40 of the first embodiment. The switch control circuit 47 determines the total ON number of the main elements 4 based on the digital value outputted from the waveform-shaping part 32. The switch control circuit 47 selects the main elements 4 to which the control voltage is applied based on the determined total ON number. The control voltage is applied to the gates of the selected main elements 4. Furthermore, the switch control circuit 47 changes the total ON number of the main elements 4 according to change in the digital value outputted from the waveform-shaping part 32. The switch control circuit 47 applies the control voltage to the main element 4 to which the control voltage was not applied, and stops the applying of the control voltage for the main element 4 to which control voltage was applied, according to the change in the total ON number.

A current mirror circuit γ is formed in the switch circuit 46. Each branch path 46b of the switch circuit 46 in which the main element 4 is disposed defines the output side of the current mirror circuit γ. In other words, the switch circuit 46 has the sub element 48 connected in series of the main element 4 on the high potential side of the main element 4 in each branch path 46b. The current mirror circuit γ is defined by the sub element 48, the current generator 49, and the sub element 50. Both of the sub elements 48 and 50 are n-type MOSFET(s).

The gate of the sub element 48 is connected to the drain side of the sub element 50 and is connected to the gate of the sub element 50. The source of the sub element 48 is connected to the drain of the main element 4. The drain of the sub element 50 is connected with the current generator 49, and the source of the sub element 50 is connected to a ground. When the main element 4 is turned on, the current mirror circuit γ outputs a current into the branch path 46b by making a current supplied from the current generator 49 as input current.

The external output portion 28 has the capacity element 42, the second main element 43, and the Zener diode 44, similarly to the first embodiment. According to the external output portion 28 of the second embodiment, the capacity element 42 and the Zener diode 44 are connected in parallel with the switch circuit 46. The second main element 43 is connected in series of the main element 4 at each branch path 46b on the high potential side of the main element 4 and the sub element 48.

According to the second embodiment, the flow measuring device 1 includes the switch circuit 46 in which the main elements 4 are connected in parallel as a parallel circuit. When forming an edge, the control voltage is applied or stopped by at least one of the main elements 4. The edge relief part 30 changes the total ON number of the main elements 4 with progress of time, such that the signal value is gradually increased or decreased at the edge.

The control voltage output unit 29 changes the total ON number of the main elements 4 with progress of time according to the data for relief outputted from the storage part 25. Thereby, the steepness at the rising and the falling of a flow signal can be directly eased by the edge relief part 30. For this reason, in the flow measuring device 1, a flow signal can be restricted from becoming a noise source.

Modification

Figure 6:
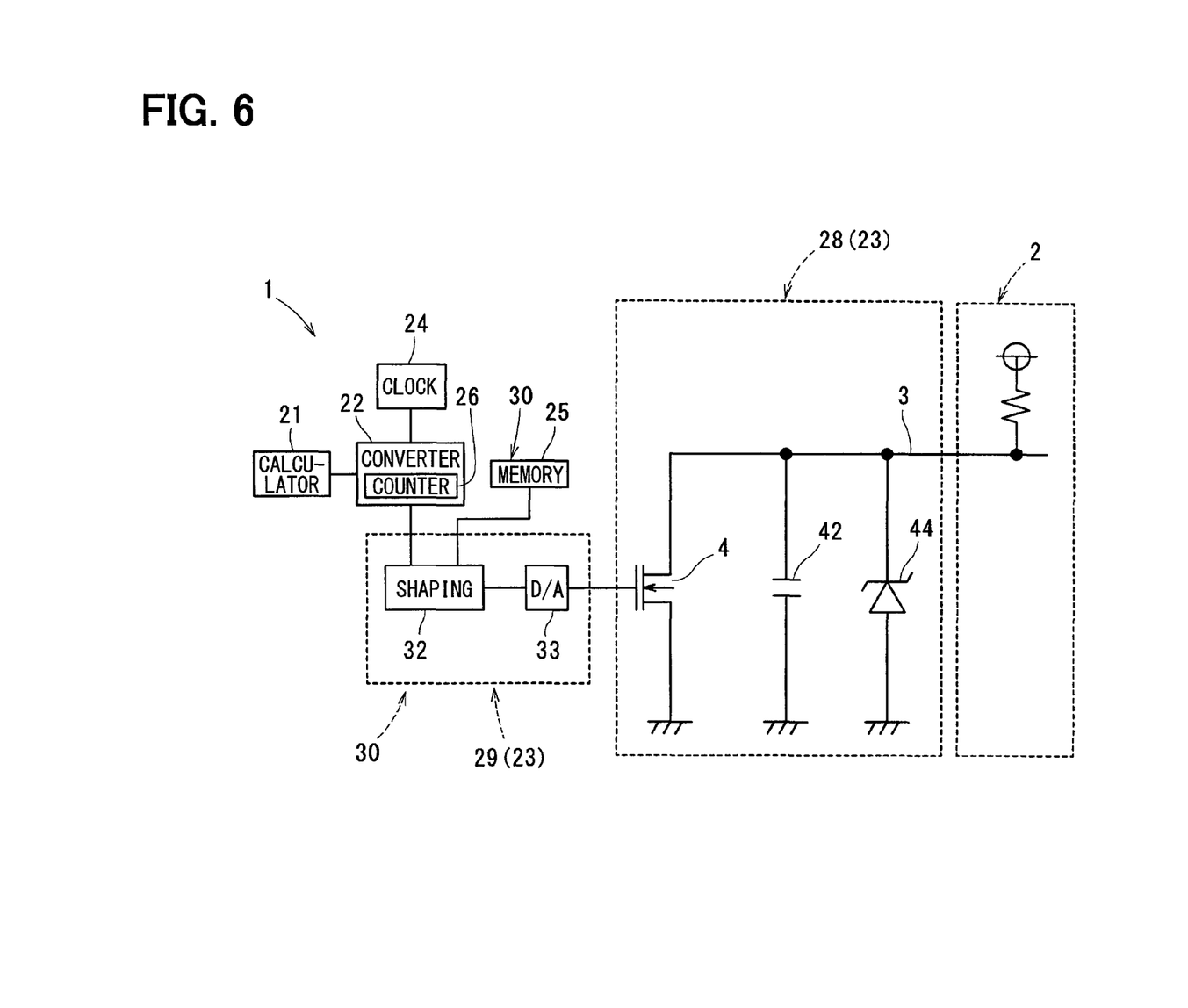
FIG. 6 is a circuit diagram illustrating a flow measuring device of a modification.

The above embodiments may be variously modified. While the control voltage is applied to the main element 4 through the current generating part 40 and the current mirror circuits α, β in the flow measuring device 1 of the first embodiment, as shown in FIG. 6, the control voltage may be applied to the main element 4 directly from the D/A conversion part 33.

Figure 7A:
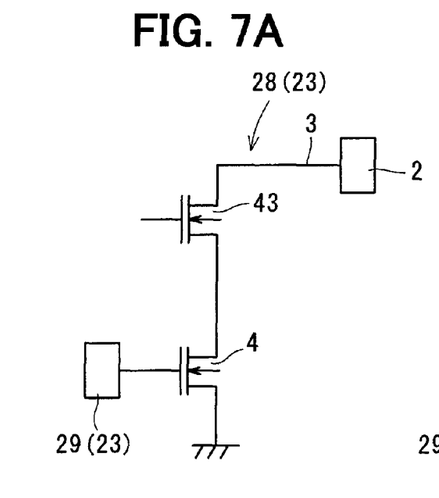
FIGS. 7A-7D are circuit diagrams illustrating modifications of an external output portion of a flow measuring device.
Figure 7B:
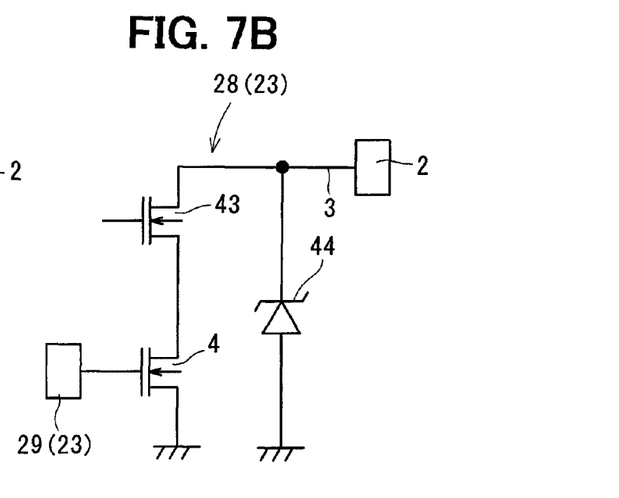
Figures 7C, 7D:
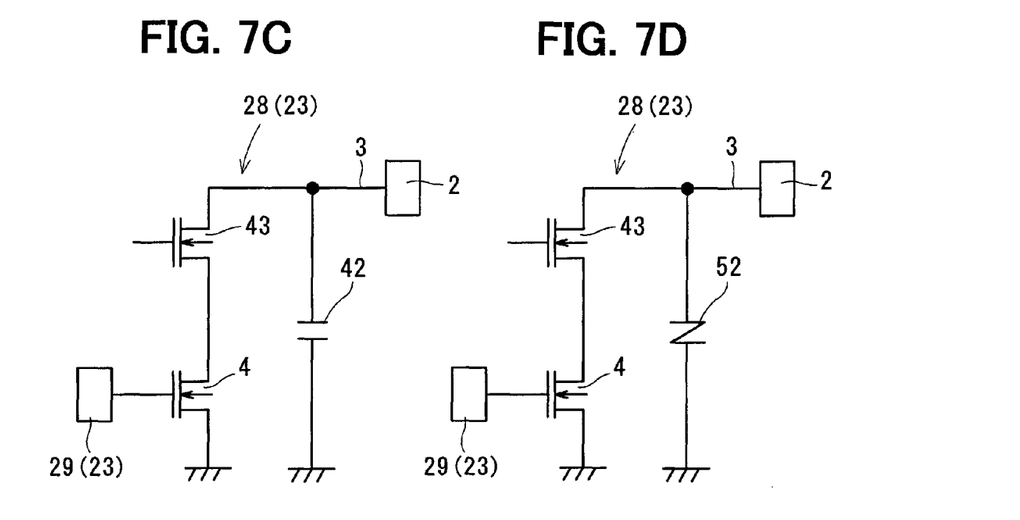

The flow measuring device 1 is not limited to have the capacity element 42, the second main element 43, and the Zener diode 44. For example, the capacity element 42 and the Zener diode 44 may be not provided (refer to FIG. 7A). The capacity element 42 may be not provided (refer to FIG. 7B). The Zener diode 44 may be not provided (refer to FIG. 7C). A varistor element 52 may be disposed in parallel with the main element 4 or the switch circuit 46 (refer to FIG. 7D) when the capacity element 42 and the Zener diode 44 are not provided.

The flow signal output from the flow measuring device 1 is not limited to the amount of intake air at the rising or falling cycle of voltage in the output wiring 3. Alternatively, a flow signal may be output as binary data of the amount of intake air.

The flow measuring device 1 is not limited to output only a flow signal related to intake air, and may output an electric signal according to physical quantity other than the flow rate. For example, the flow measuring device 1 may output at least one of a pressure signal according to pressure, a humidity signal according to humidity, and a temperature signal according to temperature together with a flow rate signal.

Figure 8:
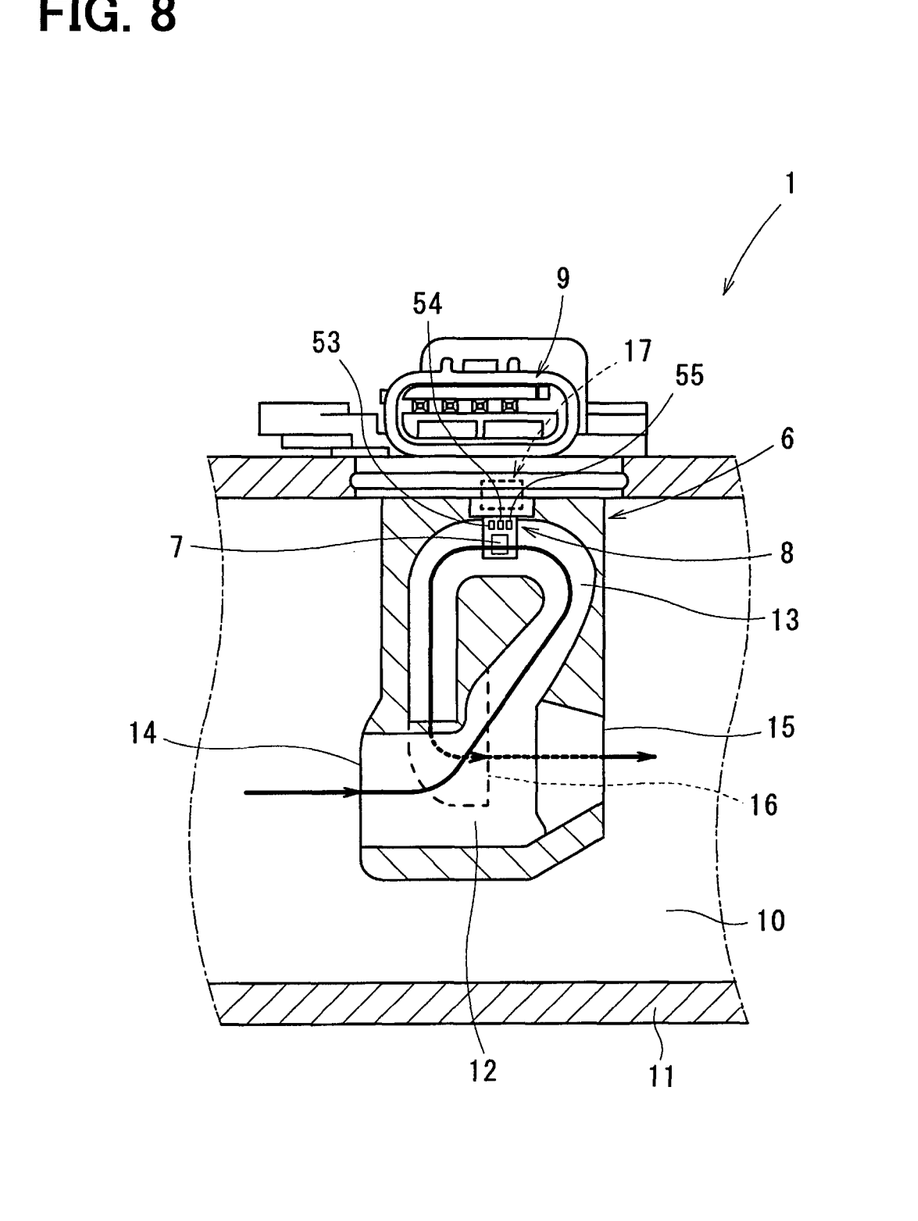
FIG. 8 is a sectional view illustrating a flow measuring device of a modification, which is attached to a duct.

For example, as shown in FIG. 8, a pressure sensor 53, a moisture sensor 54, and a temperature sensor 55, respectively outputting a pressure signal, a humidity signal, and a temperature signal may be disposed in the sensor assay 8, such that a pressure signal, a humidity signal, and a temperature signal are output with a flow rate signal to ECU 2. In this case, a pressure signal, a humidity signal, and a temperature signal are output as SENT signal, to ECU 2, with a flow rate signal.

Such changes and modifications are to be understood as being within the scope of the present disclosure as defined by the appended claims.

What is claimed is:

1. A flow measuring device comprising:
   an output portion that outputs an electric signal having a shape of rectangle wave with an edge rising or falling in a signal value, the electric signal corresponding to a flow rate of intake air drawn into an internal-combustion engine, wherein the output portion applies or stops a control voltage to a switching element disposed in an output wiring through which the electric signal is output so as to form the edge; and an edge relief part that changes the control voltage with progress of time so as to gradually increase or decrease the signal value at the edge.

2. The flow measuring device according to claim 1, wherein the edge relief part has a pattern instruction part that memorizes a pattern in which the signal value is changed at the edge and that outputs a plurality of instruction values as time series data which defines the pattern one by one according to progress of time, and a control voltage output unit that changes and outputs the control voltage with progress of time according to the instruction values outputted from the pattern instruction part.

3. The flow measuring device according to claim 2, wherein the switching element configures a current mirror circuit, and the control voltage output unit applies the control voltage to the switching element through the current mirror circuit.

4. The flow measuring device according to claim 1, further comprising:

a capacity element connected in parallel with the switching element.

5. The flow measuring device according to claim 1, further comprising:

a second switching element connected in series of the switching element on a high potential side of the switching element, wherein the second switching element has a withstand voltage that is higher than that of the switching element.

6. The flow measuring device according to claim 1, further comprising:

a Zener diode connected in parallel with the switching element.

7. The flow measuring device according to claim 1, wherein the output portion outputs the electric signal according to a physical quantity of intake air other than the flow rate.

8. The flow measuring device according to claim 7, wherein the physical quantity is at least one of pressure, humidity, and temperature.

9. A flow measuring device comprising:

an output portion that outputs an electric signal having a shape of rectangle wave with an edge rising or falling in a signal value, the electric signal corresponding to a flow rate of intake air drawn into an internal-combustion engine;

a switch circuit in which a plurality of switching elements are connected in parallel, the switch circuit being a part of an output wiring for outputting the electric signal, a control voltage being applied or stopped relative to at least one of the switching elements when the edge is formed; and an edge relief part that changes the number of the switching elements to which the control voltage is applied or stopped with progress of time so as to gradually increase or decrease the signal value at the edge.

10. The flow measuring device according to claim 9, wherein the edge relief part has a pattern instruction part that memorizes a pattern in which the signal value is changed at the edge and that outputs a plurality of instruction values as time series data which defines the pattern one by one according to progress of time, and a control voltage output unit that outputs the control voltage and that changes the number of the switching elements to which the control voltage is applied or stopped with progress of time according to the instruction values outputted from the pattern instruction part.

11. The flow measuring device according to claim 9, further comprising:

a second switching element connected in series of each of the switching elements on a high potential side of the switching element, wherein the second switching element has a withstand voltage that is higher than that of the switching element.

12. The flow measuring device according to claim 9, further comprising:

a Zener diode connected in parallel with the switch circuit.

13. The flow measuring device according to claim 9, wherein the switch circuit has a sub switching element connected in series of each of the switching elements on a high potential side of the switching element, and the sub switching element configures a current mirror circuit.

14. The flow measuring device according to claim 9, further comprising:

a capacity element connected in parallel with the switch circuit.

* * * * *